United States Patent
Sunada et al.

(10) Patent No.: US 9,759,272 B2
(45) Date of Patent: Sep. 12, 2017

(54) CLUTCH HAVING A GROOVE FORMED IN AN OUTER CIRCUMFERENTIAL SURFACE

(71) Applicants: Hirotaka Sunada, Nagoya (JP); Masao Nakayama, Nagoya (JP); Hideki Tsutsui, Yokkaichi (JP); Shintaro Nakano, Toyota (JP); Daisuke Kobayashi, Okazaki (JP)

(72) Inventors: Hirotaka Sunada, Nagoya (JP); Masao Nakayama, Nagoya (JP); Hideki Tsutsui, Yokkaichi (JP); Shintaro Nakano, Toyota (JP); Daisuke Kobayashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 14/428,550

(22) PCT Filed: Sep. 25, 2013

(86) PCT No.: PCT/JP2013/075875
§ 371 (c)(1),
(2) Date: Mar. 16, 2015

(87) PCT Pub. No.: WO2014/050870
PCT Pub. Date: Apr. 3, 2014

(65) Prior Publication Data
US 2015/0247535 A1 Sep. 3, 2015

(30) Foreign Application Priority Data

Sep. 25, 2012 (JP) ................................ 2012-211046
Jul. 25, 2013 (JP) ................................ 2013-154986
Sep. 19, 2013 (JP) ................................ 2013-194686

(51) Int. Cl.
*F16D 23/12* (2006.01)
*F16D 41/08* (2006.01)
(Continued)

(52) U.S. Cl.
CPC ............. *F16D 23/12* (2013.01); *F16D 15/00* (2013.01); *F16D 27/108* (2013.01);
(Continued)

(58) Field of Classification Search
CPC ................................ F16D 27/108; F16D 13/76
See application file for complete search history.

(56) References Cited

U.S. PATENT DOCUMENTS 1,367,309 A    2/1921  Dunham
4,244,455 A *  1/1981  Loker ..................... F16D 11/04
                                                        192/24

(Continued)

FOREIGN PATENT DOCUMENTS

JP    S35-22613 Y    9/1960
JP    S49-84813 A    8/1974
(Continued)

OTHER PUBLICATIONS

Mar. 18, 2016 Office Action issued in U.S. Appl. No. 14/429,666.
(Continued)

*Primary Examiner* — Ramya Burgess
*Assistant Examiner* — Lori Wu
(74) *Attorney, Agent, or Firm* — Oliff PLC

(57) ABSTRACT

A clutch is provided with a drive-side rotational body and a driven-side rotational body, which can move in the axial direction between a coupled position and a decoupled position. The driven-side rotational body has a groove having a helical portion and an annular portion that is deeper than the helical portion. The driven-side rotational body is urged toward the coupled position by an urging member. The
(Continued)

driven-side rotational body is moved to the decoupled position against the urging force of the urging member by insertion of a pin into the helical portion. A projection is provided on the tip of the pin, and a recessed groove for accommodating the projection when the pin is inserted into the helical portion is provided in the bottom surface of the helical portion.

11 Claims, 9 Drawing Sheets

(51) Int. Cl.
*F16D 15/00* (2006.01)
*F16D 27/108* (2006.01)
*F16D 13/76* (2006.01)

(52) U.S. Cl.
CPC ............ *F16D 41/088* (2013.01); *F16D 13/76* (2013.01); *F16D 2023/123* (2013.01)

(56) References Cited

U.S. PATENT DOCUMENTS

| | | | |
|---|---|---|---|
| 4,434,881 A | 3/1984 | Denk et al. | |
| 2010/0269769 A1 | 10/2010 | Schoeneberg et al. | |
| 2010/0283341 A1* | 11/2010 | Grosskopf | F01D 5/026 310/78 |
| 2010/0300827 A1 | 12/2010 | Jurjanz et al. | |
| 2011/0271917 A1 | 11/2011 | Ezaki et al. | |
| 2012/0067689 A1 | 3/2012 | Eastman | |
| 2013/0199885 A1* | 8/2013 | Quehenberger | F16D 13/04 192/84.1 |
| 2015/0247536 A1* | 9/2015 | Sunada | F16D 41/088 192/66.1 |

FOREIGN PATENT DOCUMENTS

| | | |
|---|---|---|
| JP | S57-119125 U | 7/1982 |
| JP | H07-1200 A | 1/1995 |
| JP | 2003-285994 A | 10/2003 |
| JP | 2006-307973 A | 11/2006 |
| JP | 2010-520395 A | 6/2010 |
| JP | 2010-203406 A | 9/2010 |
| JP | 2013-057293 A | 3/2013 |

OTHER PUBLICATIONS

English Translation of Jun. 2, 2015 Office Action issued in Japanese Patent Application No. 2013-194686.

U.S. Appl. No. 14/429,666, filed Mar. 19, 2015 in the name of Sunada et al.

U.S. Appl. No. 14/428,853, filed Mar. 17, 2015 in the name of Sunada et al.

* cited by examiner

CLUTCH HAVING A GROOVE FORMED IN AN OUTER CIRCUMFERENTIAL SURFACE

TECHNICAL FIELD

The present disclosure relates to a clutch that switches the state of power transmission from a drive-side rotational body to a driven-side rotational body by switching the coupling state of the driven-side rotational body with respect to the drive-side rotational body.

BACKGROUND ART

An engine is known that couples a mechanical pump, which circulates coolant, to the crankshaft through a clutch to operate the pump using rotational force of the crankshaft and disengages the clutch to stop operation of the pump. Clutches for switching the coupling state of the pump with respect to the crankshaft include a clutch having a drive-side rotational body coupled to the crankshaft and a driven-side rotational body, which is rotational relative to the drive-side rotational body. The clutch is maintained in the engaged state by pressing the rotational bodies against each other using magnetic force of magnets.

Such clutches include a clutch described in Patent Document 1. The clutch described in Patent Document 1 includes a coil. To disengage the clutch, energization control is performed on the coil to generate a magnetic field that cancels the aforementioned magnetic force.

PRIOR ART DOCUMENT

Patent Document

Patent Document 1: Japanese Laid-Open Patent Publication No. 2010-203406

SUMMARY OF THE INVENTION

Problems that the Invention is to Solve

In a configuration in which the clutch is maintained in the engaged state by pressing the drive-side rotational body and the driven-side rotational body against each other as described in Patent Document 1, the force needed for such pressing becomes greater as the torque that needs to be transmitted through the clutch, or, in other words, the torque needed by an auxiliary device driven and rotated by the driven-side rotational body, becomes greater. To increase the pressing force, magnets with a greater magnetic force must be employed. This necessitates a larger-sized coil to cancel the magnetic force.

The larger-sized coil enlarges the size of the clutch and increases power consumption. Therefore, the force needed for disengagement is therefore desired to be minimized while ensuring transmission of great torque.

This problem is not restricted to clutches that cancel magnetic force of magnets by generating a magnetic field as in the above-described case. The same problem is generally present in clutches that are disengaged by causing relative movement between a drive-side rotational body and a driven-side rotational body with an actuator, such as clutches that are disengaged using hydraulic pressure.

Accordingly, it is an objective of the present disclosure to provide a clutch that can be disengaged by a small force.

Means for Solving the Problems

To achieve the foregoing objective and in accordance with one aspect of the present invention, a clutch is provided that includes a drive-side rotational body, a driven-side rotational body, a groove, an urging member, and a pin. The driven-side rotational body is movable in an axial direction between a coupled position at which the driven-side rotational body is coupled to the drive-side rotational body and a decoupled position at which the driven-side rotational body is decoupled from the drive-side rotational body. The groove is formed in an outer circumferential surface of the driven-side rotational body. The groove has a helical portion that extends about an axis of the driven-side rotational body and an annular portion that is formed continuously from the helical portion and extends over an entire circumference of the driven-side rotational body and perpendicularly to the axial direction, the annular portion having a depth greater than the depth of the helical portion. The urging member urges the driven-side rotational body from the decoupled position toward the coupled position. The pin can be selectively inserted into and retracted from the groove. The pin is adapted to be inserted into the helical portion to move the driven-side rotational body to the decoupled position. The pin has a distal end portion inserted into the helical portion and a projection formed at the distal end portion. The helical portion has a bottom surface in which a recessed groove is formed to accommodate the projection when the distal end portion of the pin is inserted in the helical portion.

MODES FOR CARRYING OUT THE INVENTION

First Embodiment

A clutch according to a first embodiment will now be described with reference to FIGS. 1 to 9.

A clutch according to a first embodiment switches the state of power transmission from a crankshaft arranged in an engine to a water pump, which circulates coolant of the engine.

Figure 1:
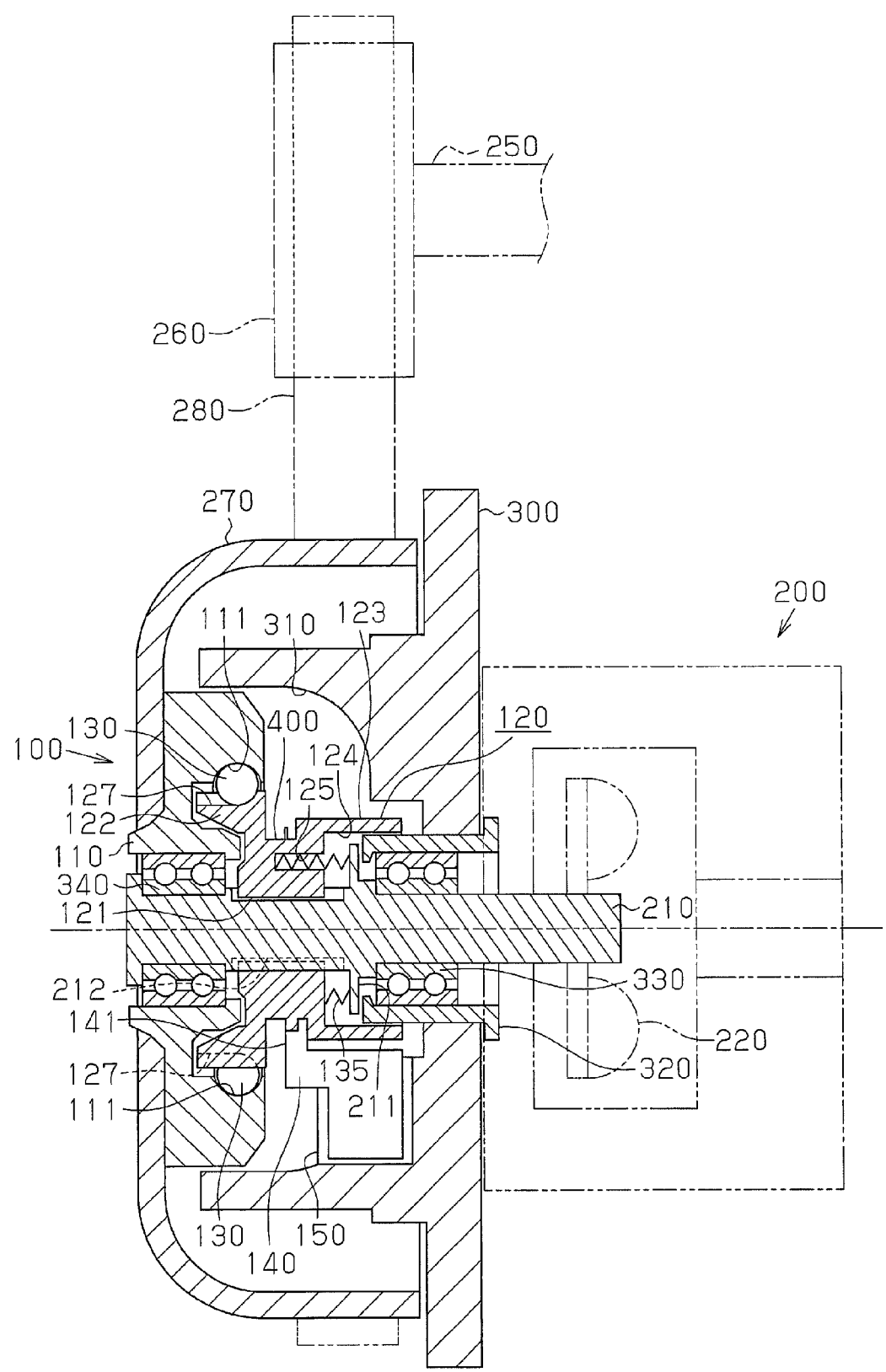
FIG. 1 is a cross-sectional view showing a clutch according to a first embodiment.

As shown in FIG. 1, a clutch 100 of the first embodiment is accommodated in an accommodating portion 310, which is arranged in a housing 300. A substantially cylindrical support member 320 is fitted in the housing 300. An output shaft 210 of the clutch 100 is rotationally supported by the support member 320 through a first bearing 330, which is located at an inner circumferential side of the support member 320.

An impeller 220 of a pump 200 is attached to a distal end portion (a right end portion as viewed in FIG. 1) of the output shaft 210 in a manner rotational integrally with the output shaft 210. A drive-side rotational body 110 is rotationally supported by a proximal end portion (a left end portion as viewed in the drawing) of the output shaft 210 through a second bearing 340. A straight spline 212 is formed in an outer circumferential surface of a portion of the output shaft 210 between the first bearing 330 and the second bearing 340.

With reference to FIG. 1, a driven-side rotational body 120 is arranged between the housing 300 and the drive-side rotational body 110. An engagement portion 121, which is meshed with the straight spline 212 of the output shaft 210, is formed in an inner circumferential surface of the driven-side rotational body 120. This configuration allows the driven-side rotational body 120 to rotate integrally with the output shaft 210 and move in the axial direction of the output shaft 210. In the first embodiment, as represented by the long dashed short dashed lines in FIGS. 1 to 3, the output shaft 210, the drive-side rotational body 110, and the driven-side rotational body 120 are arranged coaxially with one another. Hereinafter, the extending direction of the axis of these components will be referred to as the axial direction.

The driven-side rotational body 120 has an outline including two columns that have different diameters and are joined coaxially with each other. The driven-side rotational body 120 is supported by the output shaft 210 in such an orientation that a large diameter portion 122 is located on the side close to the drive-side rotational body 110 (a left side as viewed in FIG. 1) and a small diameter portion 123 is arranged on the side close to the pump 200 (a right side as viewed in the drawing).

A recess 124 having an opening facing the pump 200 is formed in the small diameter portion 123 of the driven-side rotational body 120. A plurality of accommodating recesses 125 for accommodating urging members 135 are formed in a bottom portion of the recess 124. The accommodating recesses 125 are arranged circumferentially in a manner surrounding the output shaft 210.

Each of the urging members 135 is, for example, a coil spring and accommodated in the corresponding one of the accommodating recesses 125. Each urging member 135 has a distal end secured to a securing projection 211, which projects from the output shaft 210. The urging members 135 are accommodated in the corresponding accommodating recesses 125 each in a compressed state and urge the driven-side rotational body 120 toward the drive-side rotational body 110 (leftward as viewed in FIG. 1).

A plurality of ball accommodating grooves 127 each for accommodating a corresponding one of balls 130 are formed in the large diameter portion 122 of the driven-side rotational body 120 and arranged circumferentially. An arcuate groove 111, which extends over the entire circumference of an inner circumferential surface of the drive-side rotational body 110, is formed in the inner circumferential surface of the drive-side rotational body 110. With reference to FIG. 1, the arcuate groove 111 has an arcuate cross section. Each of the balls 130 is accommodated in the space formed by the corresponding one of the ball accommodating grooves 127 and the arcuate groove 111.

When the driven-side rotational body 120 is arranged at the position illustrated in FIG. 1 after having been moved toward the drive-side rotational body 110 by the urging force of the urging members 135, the drive-side rotational body 110 and the driven-side rotational body 120 are coupled to each other through the balls 130.

Hereinafter, out of axial positions of the driven-side rotational body 120 moving axially along the output shaft 210, the position at which the drive-side rotational body 110 and the driven-side rotational body 120 are coupled to each other, as illustrated in FIG. 1, will be referred to as a coupled position.

A cup-like driven-side pulley 270, which surrounds the clutch 100 accommodated in the accommodating portion 310 of the housing 300, is attached to the drive-side rotational body 110. A drive-side pulley 260 is attached to an end portion of the crankshaft 250 in a manner rotational integrally with the crankshaft 250. The drive-side pulley 260 and the driven-side pulley 270 are coupled to each other through a belt 280, which is looped over the drive-side pulley 260 and the driven-side pulley 270.

As a result, as illustrated in FIG. 1, when the driven-side rotational body 120 is arranged at the coupled position and the drive-side rotational body 110 and the driven-side rotational body 120 are coupled to each other through the balls 130, rotation of the crankshaft 250 is transmitted to the driven-side rotational body 120 and the output shaft 210 via the drive-side pulley 260 and the belt 280. This causes the impeller 220, which rotates integrally with the output shaft 210, to supply coolant out from the pump 200. As represented by the arrows in FIGS. 2 and 3, the drive-side rotational body 110 rotates in a clockwise direction as viewed from the side corresponding to the distal end of the output shaft 210 (the side corresponding to the right end as viewed in FIGS. 2 and 3) toward the drive-side rotational body 110.

Figure 2:
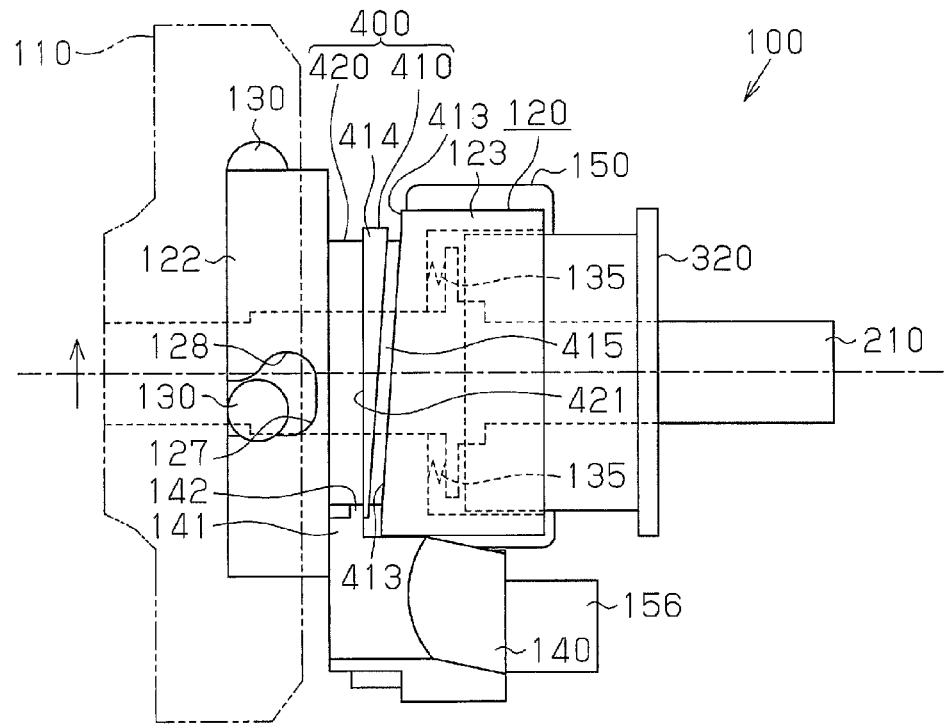
FIG. 2 is a side view showing the clutch shown in FIG. 1 in a disengaged state.
Figure 3:
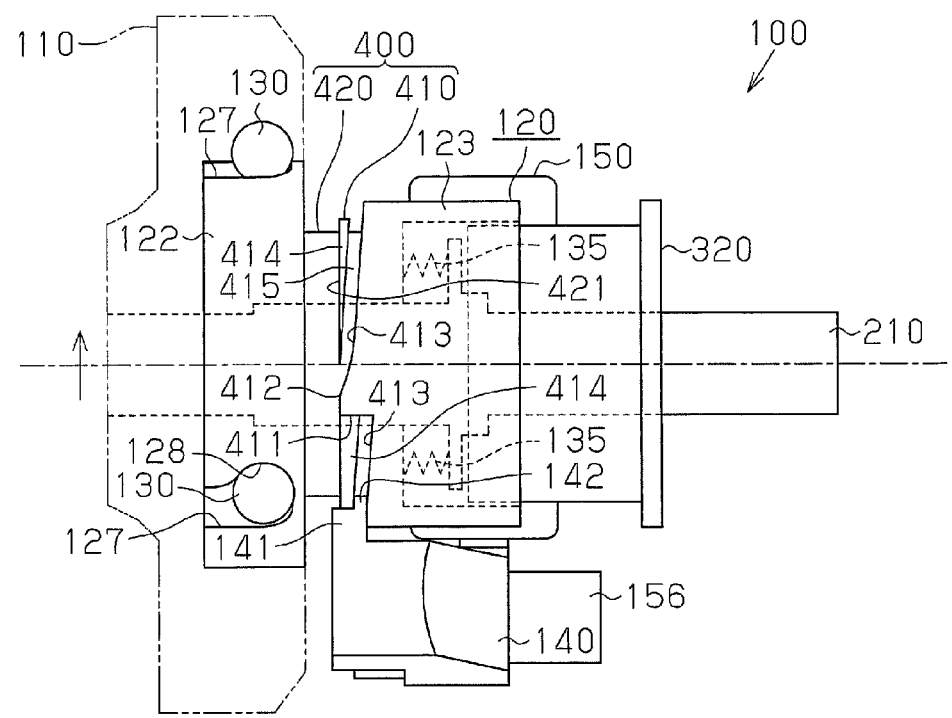
FIG. 3 is a side view showing the clutch of FIG. 1 in an engaged state.

Referring to FIGS. 2 and 3, each of the ball accommodating grooves 127, which are formed in the large diameter portion 122 of the driven-side rotational body 120, extends in the axial direction from an end surface of the large diameter portion 122 before being curved and then extends in the rotational direction of the drive-side rotational body 110. A finishing end of each ball accommodating groove 127 forms a holding portion 128.

The depth of each ball accommodating groove 127 becomes smaller in the rotational direction of the drive-side rotational body 110 such that the depth of the holding portion 128 is minimized.

As a result, as illustrated in FIG. 2, when each ball 130 is accommodated in the axially extended portion of the corresponding ball accommodating groove 127, a clearance in which the ball 130 is permitted to rotate, together with the driven-side rotational body 120, with respect to the drive-side rotational body 110 is formed between the ball accommodating groove 127 and the arcuate groove 111 (see FIG. 1) of the drive-side rotational body 110.

In contrast, as illustrated in FIG. 3, when each ball 130 is located in the corresponding holding portion 128 after having been moved in the ball accommodating groove 127, the clearance between the holding portion 128 and the arcuate groove 111 (see FIG. 1) of the drive-side rotational body 110 is small. The ball 130 is thus caught between the driven-side rotational body 120 and the drive-side rotational body 110. This restricts rotation of the ball 130 together with the driven-side rotational body 120 with respect to the drive-side rotational body 110.

In this manner, the balls 130 are non-rotational when the driven-side rotational body 120 is arranged at the coupled position illustrated in FIG. 3. This allows the driven-side rotational body 120 to rotate together with the drive-side rotational body 110. That is, when the driven-side rotational body 120 is located at the coupled position, the balls 130 are caught between the driven-side rotational body 120 and the drive-side rotational body 110 in a non-rotational manner, thus coupling the driven-side rotational body 120 to the drive-side rotational body 110.

In contrast, when the driven-side rotational body 120 is arranged at the position illustrated in FIG. 2, the balls 130 are released from the holding portions 128 and received in the axially extended portions of the corresponding ball accommodating grooves 127. Specifically, a substantially half of each ball 130 is accommodated in the arcuate groove 111 of the drive-side rotational body 110. This restricts axial movement of the ball 130 relative to the drive-side rotational body 110. When each ball 130 is received in the axially extended portion, which has a depth greater than the depth of each holding portion 128, after having been released from the holding portion 128 with a smaller depth, the ball 130 is released from the driven-side rotational body 120 and the drive-side rotational body 110. As a result, the drive-side rotational body 110 and the driven-side rotational body 120 are allowed to rotate relative to each other. That is, the driven-side rotational body 120 is decoupled from the drive-side rotational body 110.

Hereinafter, out of the axial positions of the driven-side rotational body 120 moving axially along the output shaft 210, the position at which the drive-side rotational body 110 and the driven-side rotational body 120 are decoupled from each other as illustrated in FIG. 2 will be referred to as a decoupled position.

As illustrated in FIGS. 2 and 3, a circumferential groove 400 is formed in an outer circumferential surface of the small diameter portion 123 of the driven-side rotational body 120. The groove 400 includes a helical portion 410 extending about the axis and an annular portion 420 extending perpendicularly to the axial direction. The helical portion 410 extends in a manner revolving on the outer circumferential surface of the driven-side rotational body 120 substantially by one cycle and inclined such that a side wall 413 of the helical portion 410 approaches the drive-side rotational body 110 toward the trailing end in the rotational direction of the drive-side rotational body 110. The annular portion 420 is formed continuously from the helical portion 410 and extends over the entire circumference of the outer circumferential surface of the driven-side rotational body 120. The configuration of the groove 400 will be described in detail below.

With reference to FIGS. 2 and 3, the clutch 100 includes a locking member 140 and an actuator 150 for selectively inserting and retracting a pin 141, which is arranged at the distal end of the locking member 140, with respect to the groove 400.

The axial position of the locking member 140 is restricted. As illustrated in FIG. 3, the axial position of the locking member 140 is set such that the pin 141 is inserted into a portion of the helical portion 410 of the groove 400 in the vicinity of a starting end 411 when the driven-side rotational body 120 is arranged at the coupled position. If the locking member 140 is operated by the actuator 150 to move toward the driven-side rotational body 120 when the driven-side rotational body 120 is located at the coupled position, the pin 141 is inserted into the portion of the helical portion 410 in the vicinity of the starting end 411. After having been inserted into the helical portion 410, the pin 141 is engaged with a side wall 413 of the helical portion 410, thus locking the driven-side rotational body 120 against the urging force of the urging members 135.

As shown in FIG. 3, if the pin 141 of the locking member 140 is inserted into the helical portion 410 when the driven-side rotational body 120 is coupled to the drive-side rotational body 110, the driven-side rotational body 120 is rotated with the pin 141 engaged with the side wall 413 of the helical portion 410. Then, while the pin 141 slides on the side wall 413 of the helical portion 410, the driven-side rotational body 120 moves axially from the coupled position toward the decoupled position. When the pin 141 reaches a finishing end 412 of the helical portion 410, the pin 141 is inserted into the annular portion 420 and the driven-side rotational body 120 is switched from the coupled position to the decoupled position. As has been described, the clutch 100 is configured such that, by inserting the pin 141 of the locking member 140 into the groove 400 to engage the pin 141 with the side wall 413 of the helical portion 410, the driven-side rotational body 120 is moved to the decoupled position against the urging force of the urging members 135.

When the drive-side rotational body 110 and the driven-side rotational body 120 are decoupled from each other, torque transmission from the drive-side rotational body 110 to the driven-side rotational body 120 is stopped. However, immediately after such decoupling, the driven-side rotational body 120 is continuously rotated by inertial force. Specifically, when the driven-side rotational body 120 is located at the decoupled position, the pin 141 is inserted in the annular portion 420. The driven-side rotational body 120 is thus prohibited from shifting axially. In this state, since torque transmission from the drive-side rotational body 110 to the driven-side rotational body 120 is stopped, the rotational speed of the driven-side rotational body 120 gradually decreases and such rotation eventually stops.

The driven-side rotational body 120 is urged toward the coupled position by the urging force of the urging members 135. Accordingly, to maintain the decoupled state, the pin 141 of the locking member 140 must be maintained in a state inserted in the annular portion 420 of the driven-side rotational body 120. To re-couple the drive-side rotational body 110 and the driven-side rotational body 120 to each other, the pin 141 is retracted from the annular portion 420 of the groove 400 by means of the actuator 150. After the pin 141 is retracted in this manner, the pin 141 is disengaged from the driven-side rotational body 120 and the driven-side rotational body 120 is moved to the coupled position by the urging force of the urging members 135. As a result, the drive-side rotational body 110 and the driven-side rotational body 120 are returned to the coupled state.

Figure 4:
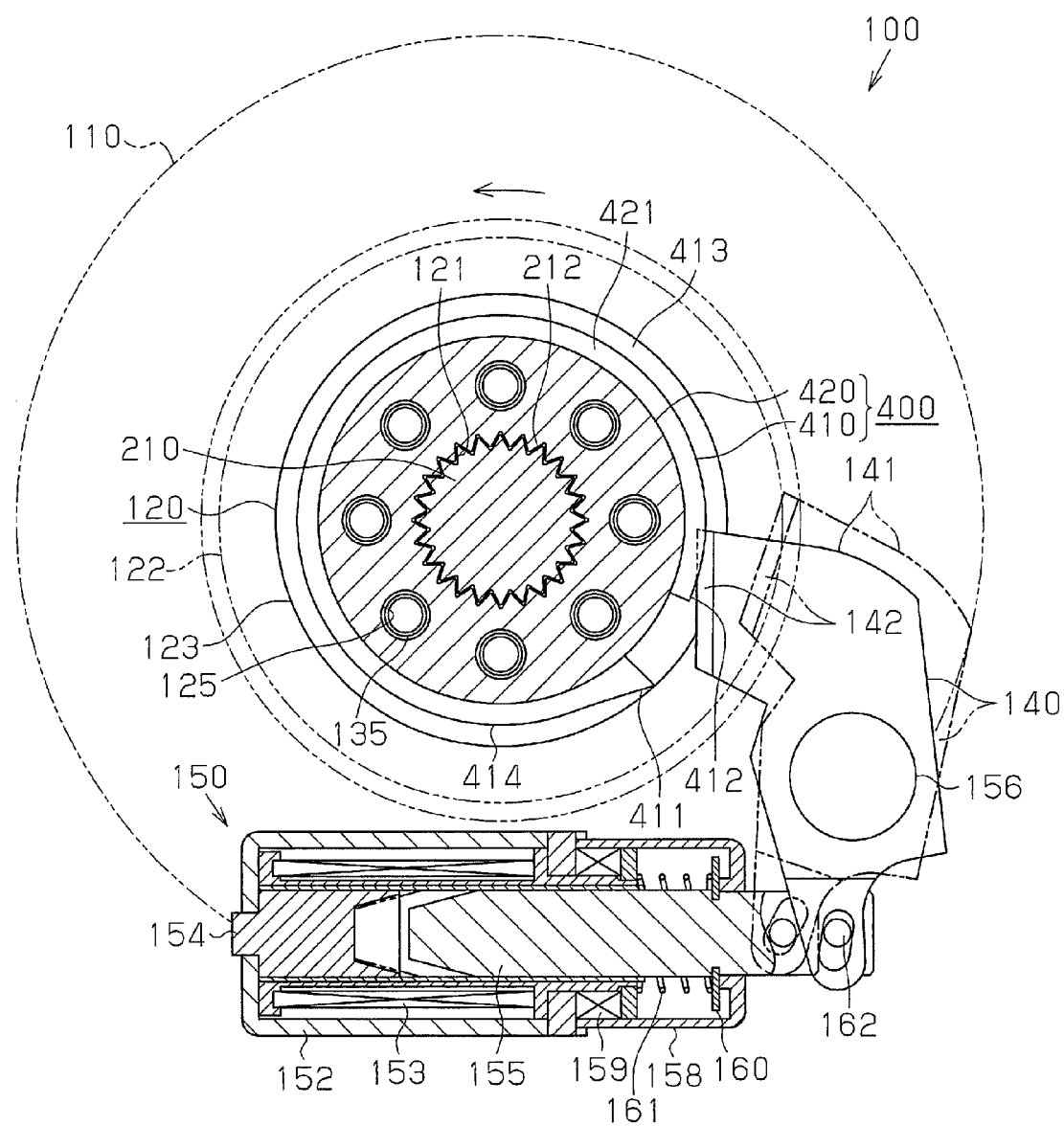
FIG. 4 is a cross-sectional view illustrating the relationship between a groove of a driven-side rotational body and a stopper member and the configuration of an actuator for operating the stopper member.

As illustrated in FIG. 4, in the groove 400, which is formed in the outer circumferential surface of the driven-side rotational body 120, the depth of the annular portion 420 is greater than the depth of the helical portion 410. In other words, a bottom surface of the annular portion 420 is arranged radially inward of a bottom surface 414 of the helical portion 410. This arrangement forms a step in a portion at which the helical portion 410 and the annular portion 420 are connected together as illustrated in FIGS. 2 and 3. A side wall 421 of the step restricts return of the pin 141, which has been moved from the helical portion 410 to the annular portion 420, from the annular portion 420 to the helical portion 410.

However, to shift the pin 141 from the helical portion 410 to the annular portion 420 as the driven-side rotational body 120 rotates, the pin 141 must be inserted into the annular portion 420, which has the greater depth, such that the pin 141 becomes engaged with the side wall 421 of the step between the helical portion 410 and the annular portion 420. The amount by which the pin 141 is inserted thus must be increased. To increase the inserting amount of the pin 141 to engage the pin 141 with the side wall 421 of the step, a certain time is necessary. If the rotational speed of the drive-side rotational body 110 is great, the time needed for the pin 141 to re-enter a phase including the helical portion 410 after having passed the finishing end 412 of the helical portion 410 may be smaller than the time needed for engaging the pin 141 with the side wall 421 of the step in some cases. In these cases, the pin 141 cannot be moved to the annular portion 420 and a disengaged state may not be maintained appropriately. If the actuator 150 for operating the pin 141 is enlarged in size, the inserting amount of the pin 141 is increased and the time needed for engaging the pin 141 with the side wall 421 of the step is decreased. However, the clutch becomes larger-sized.

In this regard, as shown in FIGS. 2 and 3, the clutch 100 of the first embodiment has the projection 142, which projects from the distal end of the pin 141, and the recessed groove 415 for accommodating the projection 142, which is formed in the bottom surface 414 of the helical portion 410. Specifically, in the first embodiment, the bottom surface of the recessed groove 415 and the bottom surface of the annular portion 420 are arranged at equal depths (which are the same radial position). Also, in the first embodiment, the projection 142 is formed extend along the surface of the pin 141 that becomes engaged with the side wall 413 of the helical portion 410.

The structure of the actuator 150 will now be described.

As illustrated in FIG. 4, the actuator 150 of the first embodiment is an electromagnetic actuator, which is operated through action of a magnetic field generated by energizing a coil 153 accommodated in a first case 152.

The first case 152 has a cylindrical shape having a bottom portion and a fixed core 154 is fixed to the bottom portion. The coil 153 is arranged in the first case 152 to surround the fixed core 154. That is, in the actuator 150, the fixed core 154 and the coil 153 configure an electromagnet. A movable core 155 is movably accommodated in the coil 153 of the first case 152 at a position facing the fixed core 154. The fixed core 154 and the movable core 155 of the first embodiment are both iron cores.

A cylindrical second case 158 is fixed to a distal end portion (a right end portion as viewed in FIG. 4) of the first case 152. A permanent magnet 159 is fixed to an end portion of the second case 158 fixed to the first case 152 in a manner surrounding the movable core 155. As has been described, the movable core 155 is accommodated in the first case 152 such that a proximal end zone (a left end zone as viewed in FIG. 4) of the movable core 155 faces the fixed core 154. A distal end zone (a right end zone as viewed in the drawing) projects outward from the second case 158.

A ring member 160 is attached to the portion of the movable core 155 that is accommodated in the second case 158. A coil spring 161, which has an end secured to the second case 158 and an opposite end secured to the ring member 160, is accommodated in the second case 158 in a compressed state.

The coil spring 161 urges the movable core 155 in the direction in which the movable core 155 projects from the second case 158 (rightward as viewed in FIG. 4). The portion of the movable core 155 that projects from the second case 158 is coupled to the locking member 140 through a fixing pin 162.

The locking member 140 is pivotally coupled to the movable core 155 at the proximal end of the locking member 140 and pivotally supported by a pivot shaft 156. This allows the locking member 140 to pivot about the pivot shaft 156, which is a support point of pivot, when the movable core 155 moves. As a result, as represented by the solid lines in FIG. 4, as the extent of projection of the movable core 155 from the second case 158 is increased by the urging force of the coil spring 161, the pin 141 of the locking member 140 is inserted sequentially into the helical portion 410 and the annular portion 420 of the driven-side rotational body 120.

If the coil 153 is energized in this state, a magnetic field is generated through such energization to magnetize the fixed core 154 and the movable core 155. The movable core 155 is thus attracted to the fixed core 154 against the urging force of the coil spring 161. The direction of the magnetic field generated by the coil 153 at this stage matches with the direction of the magnetic field generated by the permanent magnet 159.

As the movable core 155 is attracted and moved toward the fixed core 154 (leftward as viewed in FIG. 4), the locking member 140 is pivoted clockwise as viewed in FIG. 4 to retract the pin 141 of the locking member 140 from the groove 400 as represented by the long dashed double-short dashed lines in FIG. 4. That is, the actuator 150 retracts the pin 141 of the locking member 140 from the groove 400 by attracting the movable core 155 using magnetic force produced through energization of the coil 153.

After the movable core 155 is attracted and moved to a contact position at which the movable core 155 contacts the fixed core 154 (the position represented by the long dashed double-short dashed lines in FIG. 4), the movable core 155 is held in contact with the fixed core 154 by the magnetic force of the permanent magnet 159 even if the energization is stopped afterwards.

In contrast, if the coil 153 is energized by an electric current flowing in the opposite direction to the direction of the electric current for attracting the movable core 155 when the movable core 155 is arranged at the contact position represented by the long dashed double-short dashed lines in FIG. 4, a magnetic field is generated in the opposite direction to the direction of the magnetic field of the permanent magnet 159. This attenuates the attracting force of the permanent magnet 159, and the movable core 155 is separated from the fixed core 154 by the urging force of the coil spring 161. The movable core 155 then moves to the projected position represented by the solid lines in FIG. 4. As the movable core 155 is moved from the contact position to the projected position, the locking member 140 is pivoted counterclockwise as viewed in FIG. 4 and the pin 141 of the locking member 140 is inserted into the groove 400.

When the movable core 155 is located at the projected position at which the movable core 155 is separated from the fixed core 154, the urging force of the coil spring 161 exceeds the attracting force of the permanent magnet 159. As a result, if the coil 153 is energized to separate the movable core 155 from the fixed core 154, the movable core 155 is held at the projected position even after such energization is stopped afterward.

That is, the actuator 150 of the first embodiment is a self-holding type solenoid, which switches the engagement state of the clutch 100 by applying direct electric currents in different directions and thus moving the movable core 155 and does not need the energization to maintain the clutch 100 in either the engaged state or the disengaged state.

Figure 5:
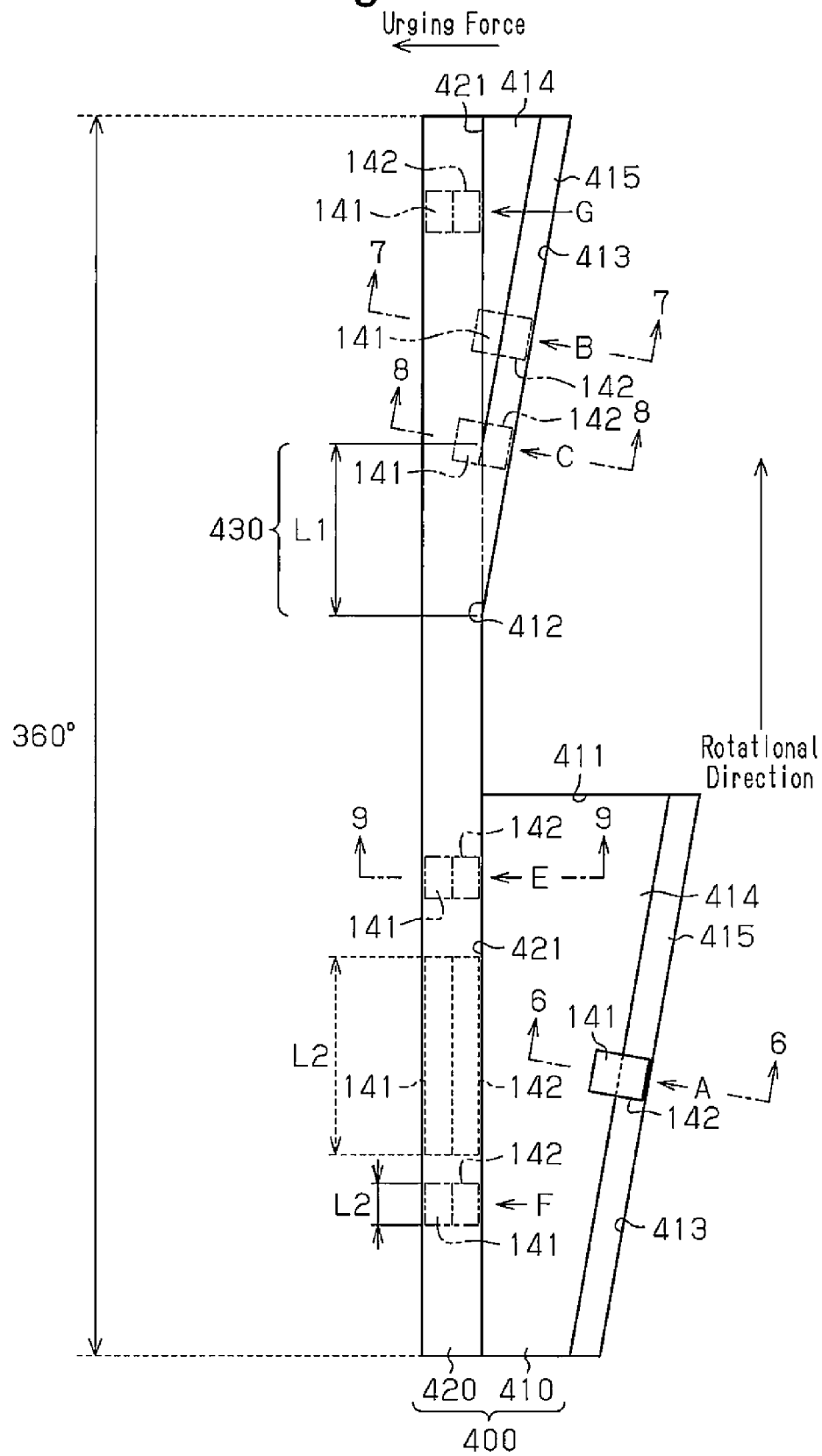
FIG. 5 is a developed view showing a groove of the clutch of FIG. 1.

Operation of the clutch according to the present embodiment will now be described with reference to FIGS. 5 to 9. Specifically, FIG. 5 is a developed view showing the groove 400, which illustrates the inclination and width of the helical portion 410 in exaggerated manners for illustrative purposes. Further, in FIG. 5, states of relative movement of the pin 141 of the locking member 140 in the groove 400 when the driven-side rotational body 120 rotates are illustrated by the pin 141 at several positions represented by long dashed double-short dashed lines. FIGS. 5 to 9 represent the boundary between the helical portion 410 and the annular portion 420 by long dashed double-short dashed lines. The long dashed double-short dashed lines representing the boundary coincide with the extended line of the side wall 421 of the step between the helical portion 410 and the annular portion 420.

As described above, when the movable core 155 of the actuator 150 is arranged at the contact position, the pin 141 of the locking member 140 is located in the exterior of the groove 400. At this stage, the driven-side rotational body 120 is held at the coupled position by the urging force of the urging members 135 such that the clutch 100 is in the engaged state. That is, the clutch 100 transmits rotation of the drive-side rotational body 110 to the output shaft 210. In this state, by energizing the coil 153 of the actuator 150 to generate a magnetic field in the direction opposite to the direction of the magnetic field of the permanent magnet 159, the movable core 155 is moved from the contact position to the projecting portion by the urging force of the coil spring 161. The pin 141 of the locking member 140 is thus inserted into a portion of the groove 400 of the driven-side rotational body in the vicinity of the starting end 411 of the helical portion 410.

Figure 6:
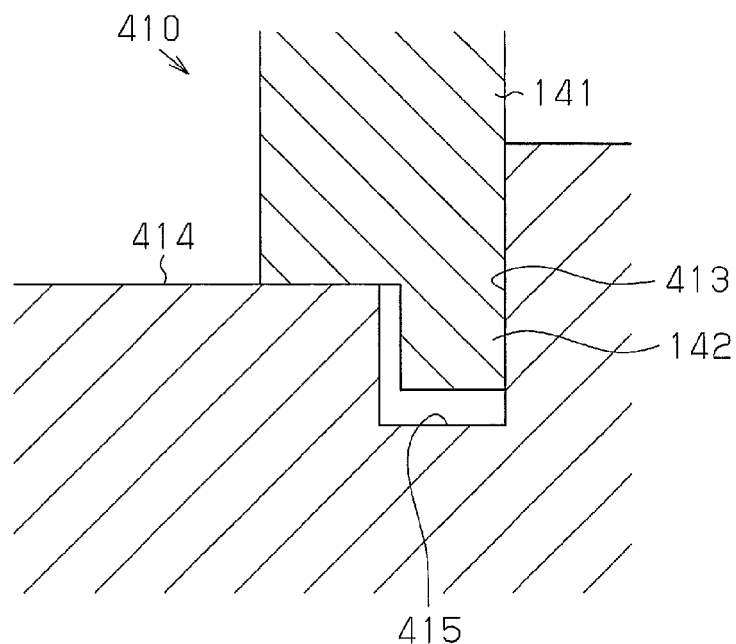
FIG. 6 is a cross-sectional view taken along line 6-6 in FIG. 5.

As represented by the leftward arrow in FIG. 5, the urging force of the urging members 135 is constantly applied to the driven-side rotational body 120. Accordingly, when the pin 141 is inserted in the portion of the helical portion 410 in the vicinity of the starting end 411, for example, when the pin 141 is located at a position A, the pin 141 and the side wall 413 of the helical portion 410 are engaged with each other as illustrated in FIG. 6. Also, the distal end portion of the pin 141 and the bottom surface 414 of the helical portion 410 are held in contact with each other. Further, the projection 142, which projects from the distal end portion of the pin 141, is accommodated in the recessed groove 415, which is formed in the bottom surface 414 of the helical portion 410. That is, when the pin 141 is inserted into the helical portion 410, the projection 142 of the pin 141 is inserted deeper than the bottom surface 414 of the helical portion 410 before contacting the bottom surface 414 of the helical portion 410. Specifically, when the pin 141 is in contact with the bottom surface 414 of the helical portion 410, the projection 142 of the pin 141 is separate from the bottom surface of the recessed groove 415.

As the driven-side rotational body 120 rotates while the pin 141 and the side wall 413 of the helical portion 410 are maintained in an engaged state in the above-described manner, the pin 141 slides on the side wall 413 in the helical portion 410. As has been described, the axial position of the locking member 140 is restricted. Therefore, as the position of the pin 141 changes in the helical portion 410, the driven-side rotational body 120 moves from the coupled position to the decoupled position in the axial direction.

Figure 7:
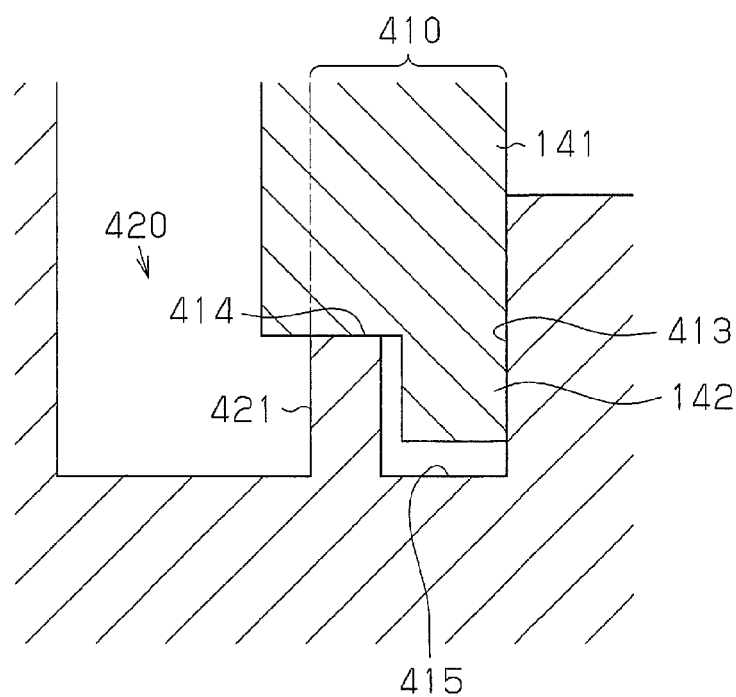
FIG. 7 is a cross-sectional view taken along line 7-7 in FIG. 5.

As illustrated in FIG. 5, the width of the helical portion 410 becomes gradually smaller in the direction of relative movement of the pin 141 toward the finishing end 412 in the helical portion 410. That is, in the direction of the relative movement of the pin 141 in the helical portion 410, the recessed groove 415, which is formed in the helical portion 410, becomes closer to the annular portion 420 such that, as illustrated in FIG. 7, the thickness of the wall between the annular portion 420 and the recessed groove 415 becomes smaller. Specifically, FIG. 7 illustrates the state of the pin 141 that has moved relatively to a position B represented in FIG. 5.

Figure 8:
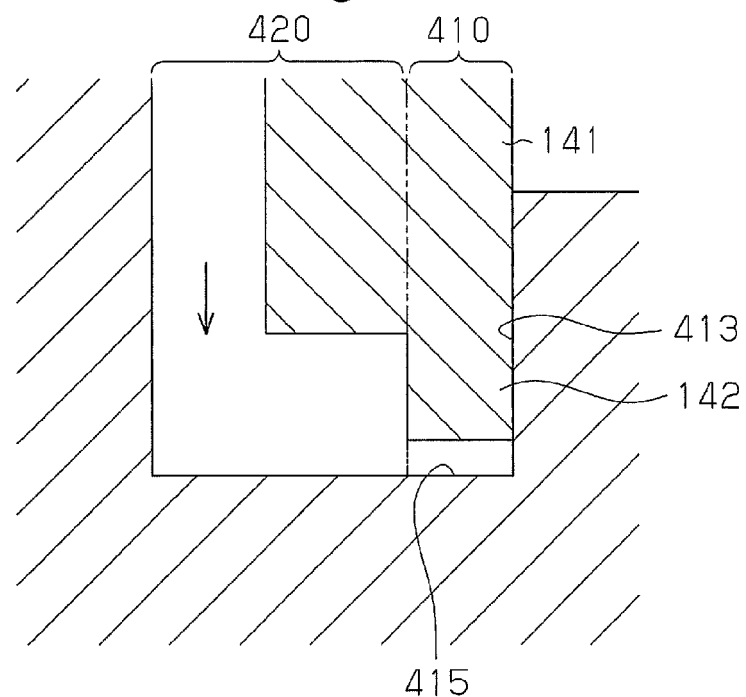
FIG. 8 is a cross-sectional view taken along line 8-8 in FIG. 5.

The pin 141 continuously moves relatively in the helical portion 410 toward the finishing end 412 and reaches a position C illustrated in FIG. 5, at which the wall between the annular portion 420 and the recessed groove 415 ends as shown in FIG. 8. The pin 141 thus enters the connecting portion 430 at which the annular portion 420 and the recessed groove 415 are connected to each other. At this stage, as illustrated in FIG. 8, the pin 141 becomes separate from the bottom surface of the groove 400 and is held in a floating state only for an instant. However, immediately after the instant, the pin 141 falls as represented by the arrow in FIG. 8 while being engaged with the side wall 413 of the helical portion 410 until the pin 141 comes into contact with the bottom surface of the recessed groove 415 of the connecting portion 430.

As has been described, the recessed groove 415 and the annular portion 420 are located at the equal depths. Therefore, after having fallen to the bottom surface of the recessed groove 415 in the connecting portion 430, the pin 141 reaches the finishing end 412 of the helical portion 410 to enter the annular portion 420. The pin 141 thus smoothly enters the annular portion 420 without falling.

In this manner, as the driven-side rotational body 120 rotates together with the drive-side rotational body 110 with the pin 141 engaged with the driven-side rotational body 120, the pin 141 moves relatively in the helical portion 410. Meanwhile, the driven-side rotational body 120 moves from the coupled position toward the decoupled position.

Then, when the pin 141 enters the annular portion 420, the driven-side rotational body 120 reaches the decoupled position. This stops transmission of rotation of the drive-side rotational body 110 to the driven-side rotational body 120, thus disengaging the clutch 100.

Immediately after the driven-side rotational body 120 and the drive-side rotational body 110 are disengaged from each other, the driven-side rotational body 120 is continuously rotated by inertial force while receiving action of friction force produced between the driven-side rotational body 120 and the pin 141, which is inserted in the annular portion 420. This causes relative movement of the pin 141, which has entered the annular portion 420, in the annular portion 420 from a position E to a position F and then a position G, as represented in FIG. 5.

Figure 9:
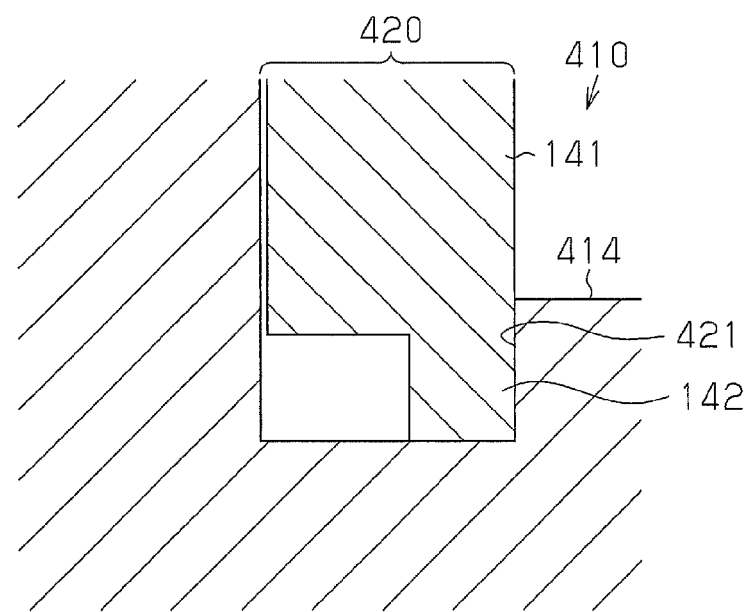
FIG. 9 is a cross-sectional view taken along line 9-9 in FIG. 5.

Specifically, when the pin 141 is inserted in the annular portion 420 and the driven-side rotational body 120 rotates as has been described, the pin 141 is engaged with the side wall 421 of the step in the boundary between the helical portion 410 and the annular portion 420 as illustrated in FIG. 9. Therefore, unless the pin 141 is shifted to be retracted from the annular portion 420 and then moves past the step, the pin 141 is prevented from being shifted to the helical portion 410. Shifting of the pin 141 from the annular portion 420 to the helical portion 410 is thus restricted. Specifically, FIG. 9 represents the state of the pin 141 that is arranged at the position E of FIG. 5.

As has been described, the driven-side rotational body 120 is continuously rotated by inertial force with the pin 141 inserted in the annular portion 420. However, friction force produced between the driven-side rotational body 120 and the pin 141 acts to gradually decrease the rotational speed of the driven-side rotational body 120. As a result, the driven-side rotational body 120 eventually stops.

As long as the pin 141 is inserted in the annular portion 420 in the above-described manner, the clutch 100 remains disengaged.

To switch the clutch 100 from the disengaged state to the engaged state, the coil 153 of the actuator 150 is energized to generate a magnetic field in the same direction as the direction of the magnetic field of the permanent magnet 159. The movable core 155 is thus attracted to the fixed core 154 by magnetic force produced through energization. This pivots the locking member 140, thus retracting the pin 141 of the locking member 140 fully from the groove 400.

After having been released from the locking member 140, the driven-side rotational body 120 is moved to the coupled position by the urging force of the urging members 135. The driven-side rotational body 120 and the drive-side rotational body 110 thus become coupled to each other, switching the clutch 100 to the engaged state.

The above described first embodiment has the following advantages.

(1) In the first embodiment, when the pin 141 is inserted in the helical portion 410 of the driven-side rotational body 120, which rotates together with the drive-side rotational body 110, the driven-side rotational body 120 rotates with the pin 141 engaged with the side wall 413 of the helical portion 410. The driven-side rotational body 120 is thus moved from the coupled position to the decoupled position against the urging force of the urging members 135. As a result, the drive-side rotational body 110 and the driven-side rotational body 120 are decoupled from each other. That is, the force needed to disengage the clutch 100 is obtained from the rotational force of the driven-side rotational body 120. Disengagement is thus achieved by small force.

(2) In the first embodiment, the projection 142 projects from the distal end of the pin 141. The recessed groove 415, which accommodates the projection 142, is formed in the bottom surface 414 of the helical portion 410. Accordingly, as has been described, when the pin 141 is inserted into the helical portion 410, the projection 142 of the pin 141 is inserted deeper than the bottom surface 414 of the helical portion 410 before contacting the bottom surface 414 of the helical portion 410. In this manner, without increasing the inserting amount of the pin 141 when the pin 141 reaches the finishing end 412 of the helical portion 410, the projection 142 becomes engaged with the side wall 421 of the step in the boundary between the helical portion 410 and the annular portion 420. Accordingly, even when the rotational speed of the drive-side rotational body 110 is great, the pin 141 can be engaged with the side wall 421 of the step. This restrains return of the pin 141 from the annular portion 420 to the helical portion 410 while restraining size enlargement of the clutch.

(3) In the first embodiment, the projection 142 of the pin 141 is formed to extend along the surface (the engagement surface) of the pin 141 that becomes engaged with the side wall 413 of the helical portion 410. This enlarges the size of the surface of the pin 141 that contacts the side wall 413 of the helical portion 410 to a larger size including the corresponding side surface of the projection 142. The surfaces by which the pin 141 and the side wall 413 of the helical portion 410 slide on each other when the driven-side rotational body 120 rotates are also enlarged in size. As a result, the contact surface pressure between the pin 141 and the side wall 413 of the helical portion 410 is decreased, and wear of the pin 141 is restrained.

The clutch is not restricted to the configuration illustrated for the first embodiment. The clutch 100 of the first embodiment may be embodied, for example, as modified in the manners described below.

In the first embodiment, referring to FIG. 5, the length L2 of the projection 142 in a direction perpendicular to the axial direction is smaller than the length L1 of the connecting portion 430 between the recessed groove 415 and the annular portion 420. However, as shown in the dashed line in FIG. 5, the length L2 of the projection 142 may be greater than the length L1 of the connecting portion 430.

When the pin 141 is in the annular portion 420, the pin 141 passes the connecting portion 430 as the driven-side rotational body 120 rotates. In the connecting portion 430, the recessed groove 415 and the annular portion 420 are not separated from each other. Therefore, when the pin 141 passes the connecting portion 430, the urging force of the urging members 135 may cause the projection 142 of the pin 141, which is inserted in the annular portion 420, to escape from the annular portion 420 back to the helical portion 410.

However, if the length L2 of the projection 142 is greater than the length L1 of the connecting portion 430 as described above, it is difficult for the projection 142 to enter the helical portion 410 from the connecting portion 430 when the pin 141 passes the connecting portion 430. This restrains shifting of the inserting position of the pin 141 from the annular portion 420 to the helical portion 410. As a result, switch to the coupled state of the drive-side rotational body 110 and the driven-side rotational body 120 despite the fact that the pin 141 is maintained in the groove 400 is restrained.

Second Embodiment

A clutch according to a second embodiment will hereafter be described with reference to FIGS. 10 to 12.

In the clutch of the second embodiment, the depth of the recessed groove 415 is smaller than the corresponding dimension of the clutch of the first embodiment. The remainder of the configuration is the same as those of the first embodiment. Thus, like or the same reference numerals are given to those components that are like or the same as the corresponding components of the first embodiment and detailed explanations are omitted. The description below is thus focused on the differences between the embodiments.

Figure 10:
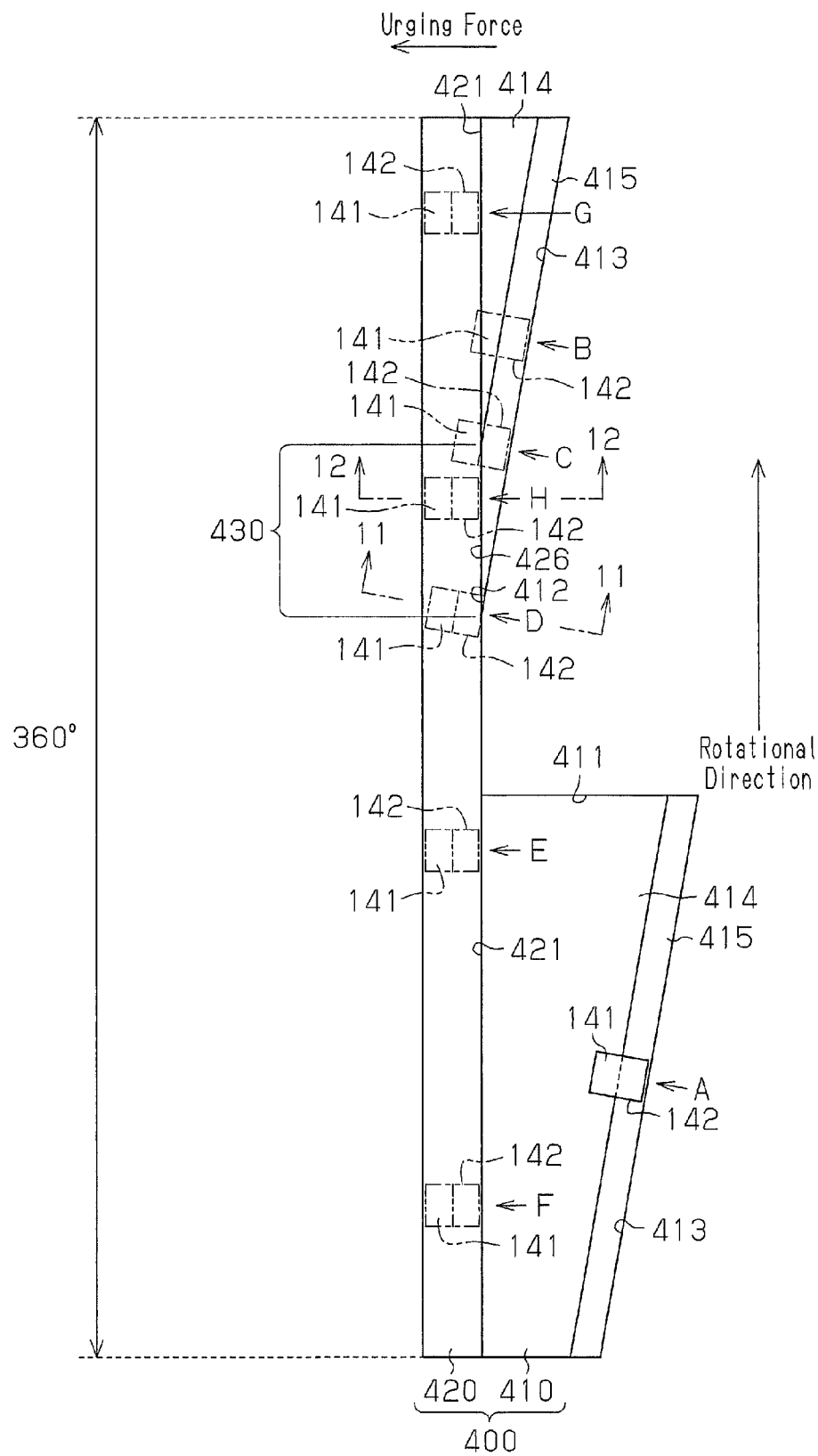
FIG. 10 is a developed view showing a groove of a clutch according to a second embodiment.
Figure 11:
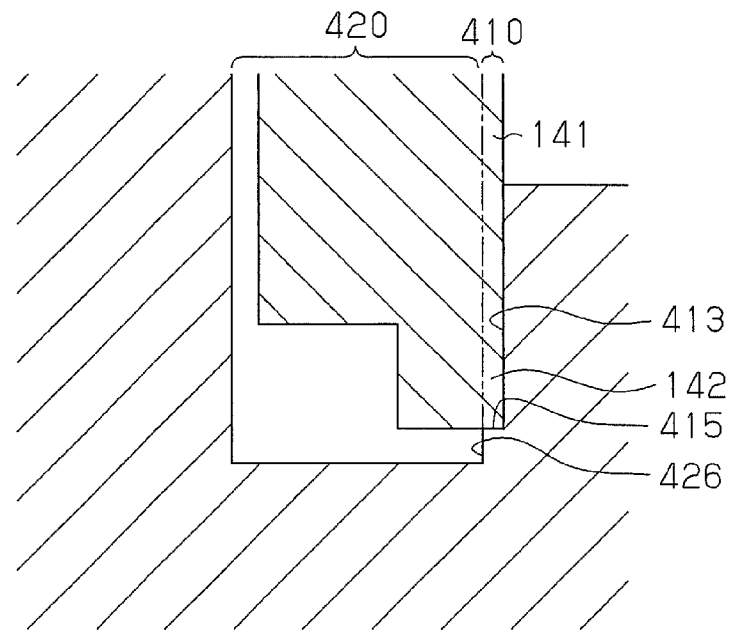
FIG. 11 is a cross-sectional view taken along line 11-11 in FIG. 10.

FIG. 10 is a developed view showing the groove 400 of the clutch 100 of the second embodiment. As in FIG. 5, the inclination and width of the helical portion 410 are illustrated in exaggerated manners in FIG. 10. Also, states of relative movement of the pin 141 of the locking member 140 in the groove 400 when the driven-side rotational body 120 rotates are illustrated by the pin 141 at several positions represented by long dashed double-short dashed lines. FIG. 10 includes a position D and a position H, in addition to the positions A, B, C, E, F, and G, which have been described referring to FIG. 5. The position D is a position between the position C and the position E. The position H is the position corresponding to the state in which the pin 141 has moved past the position G and reaches the connecting portion 430.

The depth of the recessed groove 415 of the second embodiment is slightly smaller than the depth of the recessed groove 415 of the first embodiment. The depth of the recessed groove 415 is thus smaller than the depth of the annular portion 420, as illustrated in FIGS. 11 and 12. This forms a stepped portion 426 in the connecting portion 430, at which the recessed groove 415 and the annular portion 420 are connected to each other.

Operation of the clutch 100 of the present embodiment will hereafter be described.

In the clutch 100 of the second embodiment, as in the first embodiment, when the pin 141 is inserted into the helical portion 410, the distal end portion of the pin 141 and the bottom surface 414 of the helical portion 410 come into contact with each other and the projection 142, which projects from the distal end portion of the pin 141, becomes accommodated in the recessed groove 415 formed in the bottom surface 414 of the helical portion 410. That is, when the pin 141 is inserted into the helical portion 410, the projection 142 of the pin 141 is inserted deeper than the bottom surface 414 of the helical portion 410 before contacting the bottom surface 414 of the helical portion 410.

Then, as the driven-side rotational body 120 rotates with the pin 141 maintained in a state engaged with the side wall 413 of the helical portion 410 in the above-described manner, the pin 141 slides on the side wall 413 in the helical portion 410 and moves relatively from the position A to the position B and then the position C. Specifically, in the direction of relative movement of the pin 141 in the helical portion 410, the recessed groove 415, which is formed in the helical portion 410, approaches the annular portion 420 and the thickness of the wall between the annular portion 420 and the recessed groove 415 becomes smaller.

The pin 141 continuously moves relatively in the helical portion 410 toward the finishing end 412 and passes the position C, at which the wall between the annular portion 420 and the recessed groove 415 ends. The pin 141 thus enters the connecting portion 430, by which the annular portion 420 and the recessed groove 415 are connected to each other. As has been described, in the clutch 100 of the second embodiment, the depth of the recessed groove 415 is smaller than the depth of the annular portion 420. Accordingly, when the pin 141 enters the connecting portion 430 and reaches the position where there is no wall between the annular portion 420 and the recessed groove 415, the pin 141 is in contact with the bottom surface of the recessed groove 415, as illustrated in FIG. 11. Specifically, FIG. 11 illustrates the state of the pin 141 that has moved relatively to the position D, which is the state immediately before the pin 141 passes the finishing end 412 of the helical portion 410.

As has been described, the depth of the recessed groove 415 is smaller than the depth of the annular portion 420. Therefore, after having fallen to the bottom surface of the recessed groove 415 in the connecting portion 430, the pin 141 passes the finishing end 412 of the helical portion 410. Then, to enter the annular portion 420, the pin 141 falls by the distance corresponding to the difference between the depth of the recessed groove 415 and the depth of the annular portion 420. The pin 141 then enters the annular portion 420.

After the pin 141 enters the annular portion 420, the driven-side rotational body 120 reaches the decoupled position. This stops transmission of rotation of the drive-side rotational body 110 to the driven-side rotational body 120. The clutch 100 is thus switched to a disengaged state.

In a period immediately after the driven-side rotational body 120 and the drive-side rotational body 110 are decoupled from each other, the driven-side rotational body 120 is rotated continuously by inertial force while receiving action of friction force produced between the driven-side rotational body 120 and the pin 141. This causes relative movement of the pin 141, which has entered the annular portion 420, from the position E to the position F, the position G, and then the position H in the annular portion 420, as illustrated in FIG. 10.

Specifically, when the driven-side rotational body 120 is rotated with the pin 141 inserted in the annular portion 420, the pin 141 is engaged with the side wall 421 of the step in the boundary between the helical portion 410 and the annular portion 420. Accordingly, unless the pin 141 is shifted to be retracted from the annular portion 420 and then moves past the step, the pin 141 is prevented from being shifted to the helical portion 410. Shifting of the pin 141 from the annular portion 420 to the helical portion 410 is thus restricted.

Figure 12:
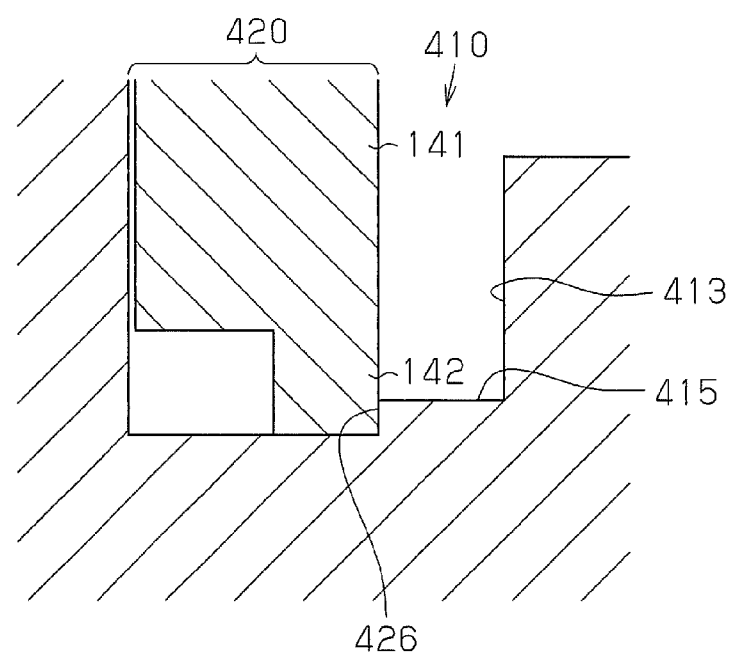
FIG. 12 is a cross-sectional view taken along line 12-12 in FIG. 10.

Further, as illustrated in FIG. 12, the step 426 is formed in the boundary between the annular portion 420 and the recessed groove 415. Therefore, when the pin 141, which is inserted in the annular portion 420, passes the connecting portion 430, the projection 142 becomes engaged with the stepped portion 426.

The above described second embodiment achieves the following advantage (4) as well as advantages similar to the advantages (1) to (3) of the first embodiment.

(4) When the pin 141 that has entered the annular portion 420 passes the connecting portion 430, the projection 142 of the pin 141 is engaged with the stepped portion 426 between the annular portion 420 and the recessed groove 415. Thus, the pin 141 is prevented from being returned to the helical portion 410 when passing the connecting portion 430.

Third Embodiment

A clutch according to a third embodiment will be described with reference to FIG. 13.

Figure 13:
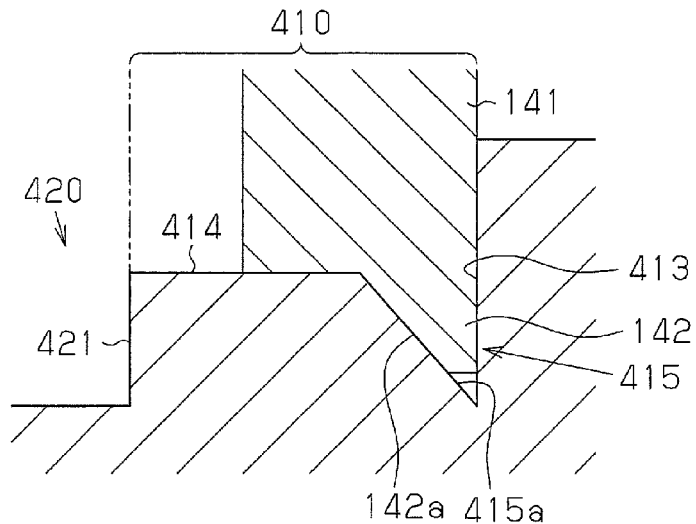
FIG. 13 is a cross-sectional view showing a pin and a groove of a clutch according to a third embodiment.

As illustrated in FIG. 13, a clutch 100 according to the third embodiment is different from the first embodiment in terms of the shape of the projection 142 of the pin 141 and the shape of the recessed groove 415 of the groove 400. The remainder of the configuration is the same as those of the first embodiment. Thus, like or the same reference numerals are given to those components that are like or the same as the corresponding components of the first embodiment and detailed explanations are omitted.

When the pin 141 having the shape of the first embodiment illustrated in FIG. 6 is inserted into the helical portion 410, the distal end of the projection 142 may contact the bottom surface 414 of the helical portion 410. This may hamper smooth insertion of the projection 142 of the pin 141 into the recessed groove 415.

In the present embodiment, with reference to FIG. 13, a tapered surface 142a, which is inclined such that the size of the projection 142 decreases toward the distal end, is formed in the projection 142 of the pin 141. The tapered surface 142a is formed in the surface (the contact surface) of the projection 142 that contacts a side wall 415a of the recessed groove 415.

Also, in the third embodiment, the side wall 415a of the recessed groove 415 is formed by a tapered surface parallel to the tapered surface 142a of the projection 142.

That is, the inclination angle of the side wall 415a with respect to the side wall 413 of the helical portion 410 is equal to the inclination angle of the tapered surface 142a of the projection 142 with respect to the engagement surface of the pin 141 (the surface by which the pin 141 is engaged with the side wall 413 of the helical portion 410).

Operation of the clutch of the present embodiment will now be described.

When the pin 141 is inserted into the helical portion 410, the projection 142 of the pin 141 approaches the bottom surface 414 of the helical portion 410 as the pin 141 proceeds. At this stage, if the position of the pin 141 with respect to the driven-side rotational body 120 in the axial direction is offset leftward as viewed in FIG. 13, the tapered surface 142a of the projection 142 of the pin 141 first comes into contact with the side wall 415a of the recessed groove 415 of the helical portion 410.

As illustrated in FIG. 13, the tapered surface 142a of the projection 142 and the side wall 415a of the recessed groove 415 are inclined at equal angles. The tapered surface 142a of the projection 142 and the side wall 415a of the recessed groove 415 are thus held in tight contact with each other. As a result, after the pin 141 enters the helical portion 410 toward the bottom surface 414, the projection 142 moves toward the side wall 413 of the helical portion 410 following the inclination of the side wall 415a while maintaining the tapered surface 142a of the projection 142 in a tight contact state with the side wall 415a of the recessed groove 415.

The third embodiment, which has been described, achieves the following advantage (5) as well as advantages equivalent to the advantages (1) to (3) of the first embodiment.

(5) When the tapered surface 142a of the projection 142 is engaged with the side wall 415a of the recessed groove 415, the force acting in the direction in which the pin 141 is urged toward the side wall 413 of the helical portion 410 is applied to the pin 141 by the force acting in the direction in which the pin 141 is inserted. This ensures tight contact between the projection 142 of the pin 141 and the side wall 415a of the recessed groove 415 and tight contact between the pin 141 and the side wall 413 of the helical portion 410.

The clutch according to the present disclosure is not restricted to the configurations of the illustrated embodiments but may be embodied in the forms described below, which are modified as needed from the embodiments.

Figure 14:
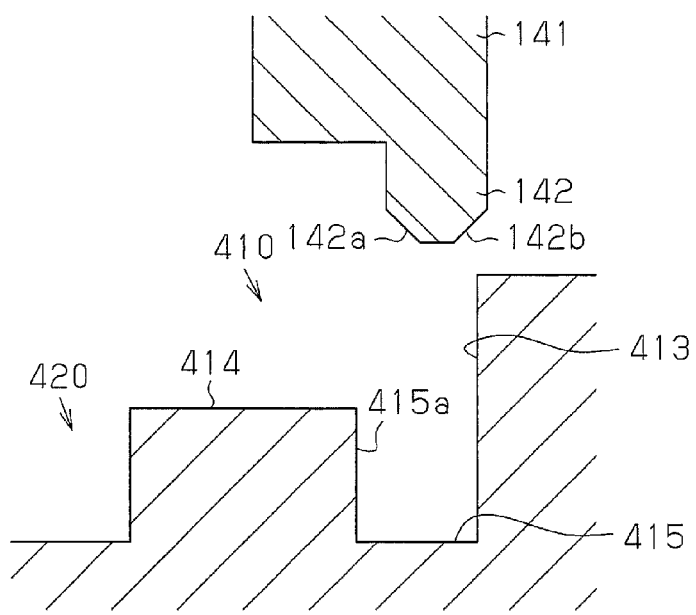
FIG. 14 is a cross-sectional view showing a pin and a groove of a modification.

In the third embodiment, the tapered surface 142a is arranged in the surface of the pin 141 that contacts the side wall 415a of the recessed groove 415. However, as long as the projection 142 of the pin 141 is inserted into the groove 400 smoothly, the projection 142 of the pin 141 may be formed in any suitable shape. For example, as illustrated in FIG. 14, the projection 142 may be configured to include not only the tapered surface 142a, which is formed at the distal end of the surface (the contact surface) that contacts the side wall 415a of the recessed groove 415, but also a tapered surface 142b formed at the distal end of the surface (the contact surface) that contacts the side wall 413 of the helical portion 410.

In this case, even if the relative axial positions of the pin 141 and the driven-side rotational body 120 are offset from each other and the distal end of the projection 142 contacts the bottom surface 414 of the helical portion 410 when the pin 141 is inserted into the helical portion 410, the pin 141 and the driven-side rotational body 120 slide on each other through the tapered surface 142a. This changes the relationship between the position of the pin 141 and the position of the driven-side rotational body 120 in the axial direction. Also, as illustrated in FIG. 14, even if the relative axial positions of the pin 141 and the driven-side rotational body 120 are offset from each other and the distal end of the projection 142 contacts the outer circumferential surface of the driven-side rotational body 120 when the pin 141 is inserted into the helical portion 410, the pin 141 and the driven-side rotational body 120 slide on each other through the tapered surface 142b. This changes the relationship between the position of the pin 141 and the position of the driven-side rotational body 120 in the axial direction. The axially offset positions of the pin 141 and the driven-side rotational body 120 are thus corrected so that the projection 142 is guided into the helical portion 410.

Alternatively, only the tapered surface 142b may be formed without forming the tapered surface 142a. Also in this case, even if the relative axial positions of the pin 141 and the driven-side rotational body 120 are offset from each other and the distal end of the projection 142 contacts the outer circumferential surface of the driven-side rotational body 120 when the pin 141 is inserted into the helical portion 410, the pin 141 and the driven-side rotational body 120 slide on each other through the tapered surface 142b. This changes the relationship between the position of the pin 141 and the position of the driven-side rotational body 120 in the axial direction. The axially offset positions of the pin 141 and the driven-side rotational body 120 are thus corrected such that the projection 142 is guided into the helical portion 410.

A similar advantage can be obtained by forming at least the distal end of the projection 142 into a semispherical shape or a conical shape to taper the distal end.

In each of the illustrated embodiments, the recessed groove 415 is formed only in the helical portion 410. However, a recessed groove may be formed also in the annular portion 420. In this case, the projection 142 of the pin 141 is maintained in a state accommodated in the recessed groove formed in the annular portion 420 also when the pin 141 moves relatively in the annular portion 420 and passes the connecting portion 430. This ensures the advantage that return of the pin 141 to the helical portion 410 when the pin 141 passes the connecting portion 430 is restrained, in addition to the advantages equivalent to the advantages (1) to (3).

In each of the illustrated embodiments, the projection 142 of the pin 141 is formed extend along the surface of the pin 141 that becomes engaged with the helical portion 410. However, as long as the projection 142 of the pin 141 is inserted deeper than the bottom surface 414 when the pin 141 is inserted in the helical portion 410, the projection 142 does not necessarily have to be formed at the aforementioned position. For example, the projection 142 may be formed at a middle position in the pin 141 such that the distances from the opposite side surfaces of the pin 141 to the projection 142 become equal. If the projection 142 is formed at such a position, the recessed groove 415 of the helical portion 410 may be arranged at a position between the side wall 413 of the helical portion 410 and the side wall 421 of the step to accommodate the projection 142.

When the pin 141 is inserted in the helical portion 410, only contact between the distal end of the projection 142 of the pin 141 and the bottom surface of the recessed groove 415 may be brought about without causing contact between the bottom surface 414 of the helical portion 410 and the pin 141. Also in this configuration, when the pin 141 is inserted in the helical portion 410 and engaged with the side wall 413, the projection 142 of the pin 141 is inserted deeper than the bottom surface 414 of the helical portion 410. As a result, as in the illustrated embodiments, the projection 142 is engaged with the side wall 421 of the step between the helical portion 410 and the annular portion 420 even without increasing the inserting amount of the pin 141 when the pin 141 reaches the finishing end 412 of the helical portion 410. Accordingly, even when the rotational speed of the drive-side rotational body 110 is great, the pin 141 is engaged with the side wall 421 of the step. This restrains return of the pin 141 from the annular portion 420 to the helical portion 410 while restraining size enlargement of the clutch.

Figure 15:
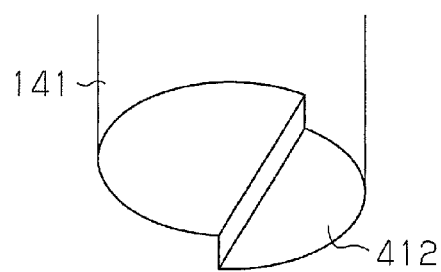
FIG. 15 is a perspective view showing the shape of a pin of another modification.

The shape of the pin 141 may be modified as needed. For example, as illustrated in FIG. 15, a portion of the pin 141 having a circular cross section may project to form the projection 142.

The number of the urging members 135 may be changed as needed. For example, the driven-side rotational body may be urged by a single urging member 135.

Each urging member 135 is not restricted to the above-described compression coil spring as long as the urging member 135 urges the driven-side rotational body 120 toward the coupled position. For example, a tension spring that pulls the driven-side rotational body 120 toward the coupled position may be employed as the urging member.

The actuator 150 is not restricted to the self-holding type solenoid but may be, for example, a solenoid that inserts the pin 141 of the locking member 140 into the groove 400 only when a coil is energized. In this configuration, the clutch 100 is disengaged only when the coil is de-energized. The clutch 100 is thus held in the engaged state when the coil cannot be energized. As a result, the pump 200 is operable even when the actuator 150 fails to operate normally.

The actuator 150 is not restricted to the solenoid but may be any suitable actuator other than the solenoid, such as a hydraulic type actuator, which selectively inserts and retracts the pin 141. Also in this case, the clutch 100 is disengaged through engagement between the groove 400 of the driven-side rotational body 120 and the pin 141 of the locking member 140. The force needed to disengage the clutch 100 is thus obtained from the rotational force of the driven-side rotational body 120. As a result, disengagement is achieved with small force.

The clutch 100 is not restricted to the configuration in which drive force is transmitted through the balls 130. The clutch 100 may be a pressing type clutch.

For example, opposed surfaces of the drive-side rotational body 110 and the driven-side rotational body 120 may be parallel tapered surfaces each inclined with respect to the axial direction. The tapered surfaces serve as pressing surfaces. By moving the driven-side rotational body 120 in the axial direction and pressing the pressing surfaces against each other, the driven-side rotational body 120 and the drive-side rotational body 110 are coupled to each other.

In each of the illustrated embodiments, the clutch switches the state of power transmission from the crankshaft 240 to the pump 200. However, the clutch according to the present disclosure may be employed as a clutch arranged between other auxiliary devices, such as a compressor or an oil pump, and the crankshaft 250. Also, the clutch according to the present disclosure is not restricted to the clutch for switching the state of power transmission from the crankshaft 250 but may be used as a clutch for switching the state of power transmission from other drive sources.

In each of the illustrated embodiments, the axial position of the locking member 140 is restricted. However, axial movement of the locking member 140 may be permitted as long as the clutch 100 is moved to the disengagement position by engaging the pin 141 of the locking member 140 with the groove 400.

The invention claimed is:
1. A clutch comprising:
a drive-side rotational body;
a driven-side rotational body movable in an axial direction between a coupled position at which the driven-side rotational body is coupled to the drive-side rotational body and a decoupled position at which the driven-side rotational body is decoupled from the drive-side rotational body;
a groove formed in an outer circumferential surface of the driven-side rotational body, wherein the groove has a helical portion that extends about an axis of the driven-side rotational body and an annular portion that is formed continuously from the helical portion and extends over an entire circumference of the driven-side rotational body and perpendicularly to the axial direction, the annular portion having a depth greater than the depth of the helical portion;
an urging member for urging the driven-side rotational body from the decoupled position toward the coupled position; and
a pin that can be selectively inserted into and retracted from the groove, wherein the pin is adapted to be inserted into the helical portion to move the driven-side rotational body to the decoupled position, wherein
the pin has a distal end portion inserted into the helical portion and a projection formed at the distal end portion,
the helical portion has a recessed groove, which receives the projection when the distal end portion of the pin is inserted in the helical portion, and a wall portion, which is located between the annular portion and the recessed groove,
a top surface of the wall portion forms a bottom surface of the helical portion, and a bottom surface of the recessed groove is arranged at a greater depth than the bottom surface of the helical portion, and
the distal end portion of the pin faces the bottom surface of the helical portion when the projection is received in the recessed groove.

2. The clutch according to claim 1, wherein
the pin has an engagement surface that is capable of engaging with a side wall of the helical portion, and
the projection is formed along the engagement surface.

3. The clutch according to claim 1, wherein
the projection has a tapered surface at least at a distal end of the projection, and
the projection is tapered toward the distal end.

4. The clutch according to claim 3, wherein
the projection has a contact surface capable of contacting a side wall of the recessed groove, and
the projection has the tapered surface at least at a distal end of the contact surface.

5. The clutch according to claim 4, wherein the side wall of the recessed groove that contacts the tapered surface is inclined by an angle equal to the angle of the tapered surface.

6. The clutch according to claim 3, wherein
the projection has a contact surface capable of contacting a side wall of the helical portion, and
the projection has the tapered surface at least at a distal end of the contact surface.

7. The clutch according to claim 1, wherein the recessed groove and the annular portion are connected to each other at a connecting portion, and
a length of the projection is greater than a length of the connecting portion in a direction perpendicular to the axial direction.

8. The clutch according to claim 1, wherein the bottom surface of the recessed groove is arranged at the same depth as a bottom surface of the annular portion.

9. The clutch according to claim 1, wherein the bottom surface of the recessed groove is arranged at a smaller depth than a bottom surface of the annular portion.

10. The clutch according to claim 1, wherein the distal end portion of the pin is in contact with the bottom surface of the helical portion when the projection is received in the recessed groove.

11. The clutch according to claim 10, wherein the projection is separate from the bottom surface of the recessed groove when the distal end portion of the pin is in contact with the bottom surface of the helical portion.

* * * * *